Patented Dec. 19, 1939

2,184,238

UNITED STATES PATENT OFFICE 2,184,238

ACCELERATOR OF VULCANIZATION

Joy G. Lichty, Stow, Ohio, assignor to Wingfoot Corporation, Wilmington, Del., a corporation of Delaware No Drawing. Application May 16, 1936, Serial No. 80,139

16 Claims. (Cl. 260—788)

This invention relates to the process of treating rubber and, more particularly, to the provision of improvements in the vulcanization of rubber in the presence of organic accelerators. It also includes the products of the process.

It has heretofore been known to vulcanize rubber in the presence of organic accelerators and also in the presence of organic accelerators in admixture with basic materials, commonly called activators, which have the property of increasing the accelerating power of the organic accelerators. It has become customary to denote the organic accelerators which are activated as primary accelerators and the basic materials which increase their accelerative power as activators or secondary or auxiliary accelerators, for most of the basic materials useful for this purpose have some accelerative power in and of themselves.

Among such known auxiliary accelerators are the activating amines such as dibenzyl amine, 2-4-diamino disphenyl amine, piperidine, benzyl amine, etc. In many cases these activating amines have been undesirable as auxiliary accelerators because of their excessive "scorching" tendencies. By this it is meant that they tend to cause vulcanization at processing temperatures to such an extent that they are incapable of use in most rubber stocks which must undergo a certain amount of processing. In other cases they may be incorporated uniformly in rubber only with difficulty. Thus, some of the activating amines are too volatile to permit their use in their free form with any degree of success.

It is an object of this invention to provide an improved process for vulcanizing rubber in the presence of two accelerators, one being a primary organic accelerator and the other an auxiliary accelerator. A further object is to provide auxiliary accelerators prepared from activating amines in a form in which their tendencies to activate the primary accelerator at milling and processing temperatures are substantially inhibited. Another object is to provide such auxiliary accelerators in a form in which they may be used in rubber compounds with uniformity of results. Other objects will become apparent as the description of the invention proceeds.

Briefly, the invention comprises the discovery that these and other objects are attained by vulcanizing a vulcanizable rubber stock in which has been incorporated an organic accelerator and an auxiliary accelerator which is a complex compound of a metal salt with an activating amine. Among the organic accelerators those which are activatable are, of course, useful in the practice of the invention. Exemplary of such activatable organic accelerators are the preferred primary accelerators of the invention, namely, the aromatic thiazyl sulphide accelerators among which are mercaptobenzothiazole, 5-nitro 1-mercaptobenzothiazole, di(benzothiazyl) disulphide, dibenzothiazyl mono sulphide, the mercapto naphtha thiazoles, ethoxy carbonyl benzothiazyl sulphide, acetonyl benzothiazyl sulphide, benzoyl benzothiazyl sulphide, 2-4-dinitrophenyl benzo thiazyl sulphide, and the like. Other primary accelerators are tetra methyl thiuram disulphide, tetra methyl thiuram mono sulphide, di penta methylene thiuram mono sulphide, 2-4-dinitro phenyl dimethyl dithiocarbamate, and other dithio carbamic acid esters such as acetonyl dimethyl dithiocarbamate, carboxy methyl dimethyl dithiocarbamate and phenacyl diethyl dithiocarbamate; the xanthate accelerators such as zinc butyl xanthate, etc. In general, these primary organic accelerators which are useful in the invention are commonly known as "ultra" or "semi-ultra" accelerators.

The auxiliary accelerators of the invention are, as stated previously, complex compounds of metal salts with activating amines. They are generally prepared by merely bringing the metal salt and the amine together, preferably in a liquid dispersion and generally in suspension or solution in water. Apparently the reaction is simply one of addition. In certain cases, it is advisable to heat the reaction mixture to provide a complete reaction between the materials. Usually the amine and metal salt react in molecular proportions but in some cases two or three or perhaps more mols of the amine add to one mol of the metal salt. Other dispersing agents such as alcohol, benzene, xylene and gasoline may, of course, be used in place of water.

Among the metal salts which may be used in preparing the complex compounds of the invention the zinc salts are preferred. Other salts are those of the alkali- and alkaline earth metals, and of magnesium, cobalt, nickel, antimony, aluminum, cadmium, bismuth and the like. Generally the bivalent metal salts will be preferred and, among these, the calcium and zinc salts, of which the zinc salts appear most desirable.

Further illustrative of metal salts are the inorganic metal salts, the metal salts of carboxylic acids, the metal salts of dithiocarbamic acids, the metal salts of the mercaptobenzothiazoles, the metal salts of dithio organic acids such as dithio furoic and dithio benzoic acids. Of these, the inorganic metal salts, the carboxylic acid metal salts and the metal salts of dithiocarbamic acids derived from primary amines are preferred. The complex compounds obtained by reacting amines with the zinc salts of dithiocarbamic acids derived from secondary amines are in general such powerful accelerators that they may be used by themselves as primary accelerators. It will be understood, however, that in certain rubber stocks they will be found desirable as activators. Among the amines which may be reacted with metal salts to form the complex compounds of the invention are the primary amines, which are preferred, and, among these, the saturated primary amines which are particularly desirable; the secondary amines of sufficient basicity to activate organic accelerators, and tertiary aliphatic amines. By the term "activating amine" it is meant to include the organic amines which have the property of activating organic accelerators of vulcanization. These are well known in the art. In general these are primary amines, secondary amines of aliphatic characteristics and tertiary aliphatic amines. It will be understood that the invention does not contemplate the use of complex salts of the amides and amidines as the amides and amidines are not amines.

Further illustrative of the invention are the following examples:

*Example 1*

The addition product of cyclohexyl amine and zinc cyclohexyl dithiocarbamate may be prepared by adding a solution of 6 grams of cyclohexyl amine in petroleum ether to a suspension of 17.5 grams of zinc cyclohexyl dithiocarbamate and 200 cc. of petroleum ether. The suspension was stirred during the addition of the cyclohexyl amine solution. This stirring was continued for a period of one hour after which the mass was filtered and the resulting precipitate washed and dried. The product was obtained in the form of a cream colored solid melting over the range of 105–125° C. and is believed to be the addition product of one mol of cyclohexyl amine and one mol of zinc cyclohexyl dithiocarbamate. An average nitrogen analysis for this product gave 8.55% as compared with the theoretical nitrogen content of the addition product of one mol of zinc cyclohexyl amine and zinc cyclohexyl dithiocarbamate of 8.20%.

*Example 2*

In the preparation of another auxiliary accelerator of the invention, a mixture of ½ mol of zinc oxalate and ½ mol of 60% aqueous ethylene diamine in 125 cc. of water was heated to boiling. During the reaction only a very small amount of the solid material went into solution. The mass was then cooled and the solid filtered off. 103 grams of a colorless solid melting at a temperature higher than 280° C. and believed to be the addition product of one mol of zinc oxalate and one mol of ethylene diamine were obtained.

*Example 3*

A solution of 47.5 grams of zinc acetate containing three molecular proportions of water of crystallization and 59.4 grams of cyclohexyl amine was formed by heating a mixture of the two materials on a hot plate. A large amount of solid material separated on cooling which, after filtering and washing with benzene, was obtained in an amount of 45 grams melting at 164–166° C. This product is believed to be the addition product of one mol of zinc acetate and two mols of cyclohexylamine. Its average nitrogen and zinc analyses were, respectively, 7.56% and 17.8%, as compared with the theoretical nitrogen and zinc contents for the addition product of one mol of zinc acetate and two mols of cyclohexyl amine of 7.36% and 17.1%.

*Example 4*

In the preparation of another auxiliary accelerator of the invention, 12.9 grams of dibutyl amine were dissolved in 50 cc. of petroleum ether and added to a suspension of 25 grams of zinc stearate in 150 cc. of petroleum ether. The mixture was allowed to stand overnight after which the petroleum ether remaining was evaporated over a steam bath. The remaining mass was then filtered hot and the precipitate dried. 22½ grams of a dry product melting at 102–106° C. and believed to be the addition product of molar proportions of zinc stearate and dibutyl amine were obtained.

*Example 5*

The addition product of zinc nitrate and piperidine is prepared by mixing 14.5 grams of $Zn(NO_3)_2.3H_2O$ with 25.5 grams of piperidine, warming the mixture slightly on a steam bath whereupon a vigorous reaction takes place, and then cooling the mixture in an ice bath to prevent decomposition of the nitrate. All of the amine appears to have reacted, for on washing the mixture with 250 cc. portions of petroleum ether and filtering, only ½ cc. of piperidine was found in the filtrate. 25.8 grams of a light yellow sticky solid melting at a temperature of 155–160° C. were obtained.

Other illustrative auxiliary accelerators of the invention prepared in a similar manner are given in the following table:

TABLE I

| | Metal salt | Additive amine | Molecular proportions | Product | Melting or decomposition point |
|---|---|---|---|---|---|
| | | | | | ° C. |
| 1 | Zinc sulphate | Ethylene diamine | 3a:1m | Colorless solid | Above 280 |
| 2 | ....do | Cyclohexylamine | 1a:1m | ....do | Above 230 |
| 3 | ....do | Amyl primary amines | 1a:1m | ....do | 175–178 |
| 4 | Zinc acetate | Ethylene diamine | 3a:1m | ....do | 210 |
| 5 | Zinc chloride | Cyclohexylamine | 2a:1m | ....do | 118–122 |
| 6 | Zinc chloride | Amyl primary amines | 2a:1m | ....do | |
| 7 | Zinc chloride | *High boiling amines | | Yellow solid | |
| 8 | Zinc chloride | Tetrahydro furfurylamine | | Colorless solid | |
| 9 | Zinc chloride | Piperidine | 2a:1m | ....do | 191–193 |
| 10 | Zinc chloride | Ethylene diamine | 3a:1m | ....do | Above 230 |
| 11 | Zinc formate | Piperidine | | ....do | 114 |

*High boiling alkylene polyamines obtained in the preparation of ethylene diamine, principally diethylene triamine and triethylene tetramine.

TABLE I—Continued

| | Metal salt | Additive amine | Molecular proportions | Product | Melting or decomposition point |
|---|---|---|---|---|---|
| | | | | | ° C. |
| 12 | Cobalt chloride | Aniline | 2a:1m | Blue solid | |
| 13 | Zinc cyclohexyl dithiocarbamate | Piperidine | 1a:1m | White solid | 95–110 |
| 14 | Zinc cyclohexyl dithiocarbamate | Butylamine | 1a:1m | Olive-green solid | 88–100 |
| 15 | Zinc tetrahydro furfuryl dtc | Piperidine | 1a:1m | Tan solid | 75–90 |
| 16 | Zinc tetrahydro furfuryl dtc | Cyclohexylamine | 1a:1m | Green semi-solid | 105–115 |
| 17 | Zinc benzyl dithiocarbamate | Piperidine | 1a:1m | Cream colored solid | 70–85 |
| 18 | Zinc benzyl dithiocarbamate | Cyclohexylamine | 1a:1m | White solid | 99–102 |
| 19 | Zinc benzyl dithiocarbamate | Dibutylamine | 1a:1m | Light brown solid | 70–80 |
| 20 | Zinc phthalate | Piperidine | 1a:1m | White solid | 250 |
| 21 | ----do---- | Cyclohexylamine | 2a:1m | White solid | Above 295 |
| 22 | Zinc stearate | Piperidine | | Cream solid | 103–109 |
| 23 | ----do---- | Cyclohexylamine | | Granular sticky solid | Below 100 |
| 24 | ----do---- | Dibenzylamine | | Granular sticky solid | Below 100 |
| 25 | ----do---- | Benzyl amine | | Light cream solid | 85–90 |
| 26 | Zinc crotonate | Piperidine | 1a:1m | Sticky solid | |
| 27 | ----do---- | Cyclohexylamine | | White solid | 110–125 |
| 28 | ----do---- | Dibutyl amine | | Sticky semi-solid | |
| 29 | ----do---- | Butyl amine | | ----do---- | |
| 30 | Zinc citrate | Cyclohexylamine | 1a:1m | White solid | Above 295 |
| 31 | ----do---- | Butyl amine | 1a:1m | ----do---- | Softens 80–90 |
| 32 | ----do---- | Benzyl amine | | Soapy semi-solid | |
| 33 | Zinc carbonate | Cyclohexylamine | | White solid | 158–165 |
| 34 | Zinc nitrate | Cyclohexylamine | | Tan solid | 158–165 |
| 35 | ----do---- | Dibenzylamine | | Light cream solid | Above 295 |
| 36 | ----do---- | Dicyclohexylamine | | Brown solid | 155–160 |
| 37 | ----do---- | Benzylamine | | Yellow crumbly solid | 80–100 |
| 38 | ----do---- | Aniline | | White solid | 140–155 |
| 39 | ----do---- | Ethyl aniline | | Light brown solid | 210–212 |
| 40 | ----do---- | Di isoamylamine | | Yellow solid | 159–161 |

"dtc" stands for dithiocarbamate.

In the third column "a" refers to the additive amine and "m" to the metal salt.

While the molecular proportions have been given in most instances, these figures are not definitely known in all cases to be the true or only proportions in which the amines and the metal salts may be combined in the final products, although these are believed to be correct. Also, the melting points or decomposition points, as they may be called, of many of the compounds have in general a fairly wide range. This is probably for the reason that after some of the heating, portions of the amine and metal salt starting materials, resulting from dissociation, are present with the addition product. These melting points were conducted in the normal atmosphere (open capillary tube).

In most cases nitrogen analyses of the complex compounds were obtained. Typical analyses are as follows:

TABLE II

Zinc acetate-ethylene diamine

| | Found | Theoretical values for— |
|---|---|---|
| Percent N | 19.90, 20.07 | 20.1 |
| Percent zinc | 15.88, 15.90 | 15.68 |

Zinc acetate-cyclohexyl amine

| | Found | Theoretical values for— |
|---|---|---|
| Percent N | 7.56, 7.56 | 7.36 |
| Percent zinc | 17.8 | 17.1 |

Zinc cyclohexyl dithiocarbamate-cyclohexylamine

| | Found | Theoretical values for— |
|---|---|---|
| Percent N | 8.60, 8.53 | 8.20 |

Zinc benzyl dithiocarbamate-dibutyl amine

| | Found | Theoretical values for— |
|---|---|---|
| Percent N | 7.58, 7.47 | 7.53 |

It will be understood that while numerous examples of the auxiliary accelerators of the invention have been described, the invention is not limited to them but include amine addition products of other metal salts. Illustrative are the piperidine-, butylamine-, cyclohexylamine-, ethylene diamine-, amyl amine-, and tetrahydro furfuryl amine addition products of zinc benzothiazyl sulphide. Others are the amine addition products of metal salts of dithiocarbamic acids derived from secondary amines, illustrative of which are the cyclohexylamine-, benzylamine-, piperidine, N-ethyl cyclohexylamine, ethylene diamine-, amylamine-, dibutyl amine-, and dibutyl ethylene diamine addition products of zinc dimethyl dithiocarbamate. These amines may also be reacted with the zinc dithiocarbamates derived from piperidine, dibenzyl amine, dibutyl amine, N-ethyl cyclohexyl amine, diamyl amine and the like. Other illustrative auxiliary accelerators of the invention are the diethanol amine and triethanol amine addition products of calcium bromide, sodium iodide, calcium chloride, calcium iodide, sodium bromide, lithium chloride and potassium iodide. Still others are the corresponding mono ethanol amine- and di and tri propanol amine addition products of the alkali- and alkaline earth metal halides and other metal salts.

Other amines which may be added to metal salts to form auxiliary accelerators of the invention are dipropyl amine, hexahydro o-, or p-toluidine, N-methyl cyclohexyl amine, N-methyl tetrahydro alpha furfuryl amine, N-ethyl tetrahydro alpha furfuryl amine, pipecoline, sym. dimethyl ethylene diamine, beta phenethylamine, heptyl amine, and methyl propyl amine.

Illustrating the use of these auxiliary accelerators in the vulcanization of rubber are the following formulae in which the compounds have been found suitable (parts refer to weight).

|  | Formula A | Formula B | Formula C |
|---|---|---|---|
| Smoked sheet rubber | 100 parts | 50 parts | 100 parts. |
| Pale crepe rubber |  | 50 parts |  |
| Zinc oxide | 5 parts | 5 parts | 5 parts. |
| Sulphur | 3 parts | 3 parts | 3 parts. |
| Titanium oxide |  |  | 10 parts. |
| Accelerator | As indicated | As indicated | As indicated. |

Illustrative compounds of the invention were incorporated into separate portions of a rubber stock corresponding to one of the above formulae after which the various rubber stocks were vulcanized for varying periods of time and physical tests obtained. The results are as follows:

TABLE II

| Cure in mins. at °F. | Ult. tens. kgs./cm.$^2$ | Max. elong. in percent | Modulus kgs./cm.$^2$ at— | |
|---|---|---|---|---|
|  |  |  | 500% | 700% |

Mercaptobenzothiazole, 0.3 part; addition product of zinc oxalate and ethylene diamine, 0.2 part; Formula B

| 20/260 | 92 | 840 | 15 | 44 |
| 30 | 127 | 820 | 21 | 69 |
| 40 | 130 | 800 | 24 | 77 |
| 60 | 140 | 795 | 27 | 86 |
| 80 | 150 | 780 | 30 | 99 |

Mercaptobenzothiazole, 0.3 part; addition product of zinc sulphate and ethylene diamine, 0.2 part; Formula B

| 20/260 | 188 | 760 | 41 | 141 |
| 30 | 190 | 740 | 47 | 165 |
| 40 | 202 | 735 | 51 | 175 |
| 60 | 192 | 730 | 53 | 179 |
| 80 | 210 | 720 | 57 | 191 |

Mercaptobenzothiazole, 03. part; addition product of cyclohexylamine and zinc benzyl dithiocarbamate, 0.2 part; Formula A

| 10/260 | 114 | 820 | 17 | 57 |
| 20 | 137 | 790 | 23 | 78 |
| 30 | 128 | 720 | 34 | 117 |
| 40 | 130 | 740 | 38 | 98 |
| 60 | 138 | 740 | 30 | 107 |

Mercaptobenzothiazole, 0.3 part; addition product of cyclohexylamine and zinc sulphate, 0.2 part; Formula B

| 20/260 | 166 | 780 | 32 | 110 |
| 30 | 168 | 750 | 35 | 129 |
| 40 | 173 | 745 | 39 | 135 |
| 60 | 178 | 740 | 40 | 141 |
| 80 | 184 | 740 | 41 | 144 |

Mercaptobenzothiazole, 0.3 part; addition product of amyl amine and zinc sulphate, 0.2 part; Formula B

| 20/260 | 114 | 780 | 24 | 75 |
| 30 | 140 | 760 | 30 | 100 |
| 40 | 154 | 755 | 34 | 115 |
| 60 | 158 | 750 | 37 | 123 |
| 80 | 164 | 740 | 38 | 129 |

Mercaptobenzothiazole, 0.3 part; addition product of cyclohexyl amine and zinc acetate, 0.2 part; Formula B

| 20/260 | 181 | 750 | 39 | 138 |
| 30 | 182 | 730 | 44 | 158 |
| 40 | 213 | 750 | 46 | 167 |
| 60 | 198 | 720 | 50 | 175 |
| 80 | 183 | 710 | 50 | 174 |

| Cure in mins. at °F. | Ult. tens. kgs./cm.$^2$ | Max. elong. in percent | Modulus kgs./cm.$^2$ at— | |
|---|---|---|---|---|
|  |  |  | 500% | 700% |

Mercaptobenzothiazole, 0.3 part; addition product of cyclohexyl amine and zinc chloride, 0.2 part; Formula B

| 20/260 | 200 | 770 | 39 | 143 |
| 30 | 208 | 760 | 43 | 159 |
| 40 | 190 | 730 | 45 | 166 |
| 60 | 208 | 740 | 47 | 168 |
| 80 | 210 | 730 | 49 | 177 |

Mercaptobenzothiazole, 0.3 part; addition product of high boiling amines and zinc chloride, 0.2 part; Formula B

| 20/260 | 42 | 775 | 10 | 29 |
| 30 | 74 | 775 | 17 | 50 |
| 40 | 90 | 750 | 21 | 67 |
| 60 | 104 | 750 | 25 | 78 |
| 80 | 113 | 740 | 27 | 87 |

Mercaptobenzothiazole, 0.3 part; addition product of tetrahydro alpha furfurylamine and zinc chloride, 0.2 part; Formula C

| 20/260 | 218 | 780 | 43 | 150 |
| 30 | 220 | 760 | 49 | 170 |
| 40 | 210 | 740 | 51 | 175 |
| 60 | 230 | 750 | 51 | 178 |
| 80 | 205 | 730 | 55 | 188 |

Mercaptobenzothiazole, 0.3 part; addition product of piperidine and zinc chloride, 0.2 part; Formula C

| 20/260 | 224 | 770 | 45 | 160 |
| 30 | 264 | 760 | 55 | 197 |
| 40 | 256 | 760 | 56 | 198 |
| 60 | 246 | 740 | 59 | 207 |
| 80 | 252 | 740 | 60 | 208 |

Mercaptobenzothiazole, 0.3 part; addition product of ethylene diamine and magnesium sulphate, 0.2 part; Formula B

| 20/260 | 158 | 730 | 37 | 132 |
| 30 | 170 | 730 | 41 | 145 |
| 40 | 160 | 710 | 44 | 153 |
| 60 | 156 | 680 | 49 | — |
| 80 | 160 | 690 | 49 | — |

Mercaptobenzothiazole, 0.3 part; addition product of mixed amyl primary amines and zinc formate, 0.2 part; Formula C

| 20/260 | 172 | 770 | 35 | 121 |
| 30 | 192 | 760 | 41 | 142 |
| 40 | 210 | 760 | 44 | 152 |
| 60 | 209 | 750 | 45 | 157 |
| 80 | 202 | 740 | 46 | 157 |

Mercaptobenzothiazole, 0.3 part; addition product of aniline and cobalt chloride, 0.2 part; Formula C

| 20/260 | 50 | 900 | 8 | 20 |
| 30 | 98 | 860 | 16 | 46 |
| 40 | 115 | 830 | 19 | 60 |
| 60 | 138 | 830 | 23 | 69 |
| 80 | 142 | 820 | 25 | 78 |

Further illustrative of the invention is the following Table III of data showing the comparative effect of four representative auxiliary accelerators of the invention when used in conjunction with the primary accelerators mercaptobenzothiazole, di(benzothiazyl) disulphide and tetramethyl thiuram disulphide. The accelerators were tested in Formula C for tensile, modulus, elongation and scorch index. The figures given are those obtained at the best or optimum cure of the stock. The "index number" indicates the scorching characteristic of the stock and was determined as described in United States Patent No.

2,017,808 to H. R. Thies. The four auxiliary accelerators and the three primary accelerators are identified in Table III as follows:

A—Addition product of zinc acetate and cyclohexyl amine (Ex. 3).
B—Addition product of zinc chloride and cyclohexyl amine (No. 5 in Table I).
C—Addition product of zinc sulphate and mixed primary amylamines (No. 3 in Table I).
D—Addition product of zinc cyclohexyl dithiocarbamate and piperidine (No. 13 in Table I).
Captax—Mercaptobenzothiazole.
Altax—Di(benzothiazyl) disulphide.
Tuads—Tetra methyl thiuram disulphide.

TABLE III

| Primary acc. | | Auxil. acc. | | Cure mins. | Ult. tens. kg./cm.$^2$ | Max. elg. | Modulus kg./cm.$^2$ | | Index number |
|---|---|---|---|---|---|---|---|---|---|
| Name | Pts. wt. | Name | Pts. wt. | | | | 500% | 700% | |
| Captax | 0.50 | None | | ° F. 40/260 | 106 | Percent 750 | 26 | 82 | 108 |
| Do | 0.30 | A | 0.20 | 25/260 | 173 | 725 | 43 | 155 | 64 |
| Do | 0.30 | B | 0.20 | 30/260 | 182 | 725 | 44 | 162 | 86 |
| Do | 0.30 | C | 0.20 | 20/260 | 157 | 720 | 39 | 138 | Less than 30 |
| Do | 0.30 | D | 0.20 | 30/260 | 165 | 750 | 36 | 126 | 93 |
| Altax | 0.50 | None | | 40/275 | 130 | 750 | 30 | 97 | Over 180 |
| Do | 0.30 | A | 0.20 | 20/275 | 166 | 725 | 40 | 145 | Over 180 |
| Do | 0.30 | B | 0.20 | 30/275 | 174 | 720 | 45 | 162 | Over 180 |
| Do | 0.30 | C | 0.20 | 30/275 | 141 | 730 | 35 | 119 | Over 180 |
| Do | 0.30 | D | 0.20 | 30/275 | 167 | 725 | 42 | 147 | 81 |
| Tuads | 0.15 | None | | 40/240 | 195 | 725 | 47 | 172 | 82 |
| Do | 0.15 | A | 0.20 | 20/240 | 197 | 775 | 36 | 134 | 62 |
| Do | 0.15 | B | 0.20 | 20/240 | 204 | 770 | 37 | 138 | 64 |
| Do | 0.15 | C | 0.20 | 30/240 | 204 | 730 | 47 | 173 | 72 |
| Do | 0.15 | D | 0.20 | 10/240 | 188 | 760 | 37 | 137 | Less than 30 |

From the preceding data, it will be seen that the auxiliary accelerators of the invention activate or increase the accelerative activity of the primary accelerator to a great extent. They are particularly valuable for use with benzothiazyl sulphide accelerators. By this invention it is possible to use practically any of the activating amines without the attendant properties inherent in many of them of being very difficult to mix uniformly with rubber. Also, their tendencies to activate the primary accelerators at processing and milling temperatures are greatly inhibited. Furthermore, the toxic qualities of some of them are considerably prevented by their use in the form of the present invention.

While the preferred embodiments of the invention have been described in detail herein, it will be understood that the invention is not so limited but that various modifications may be made therein without departing from the spirit of the invention or from the scope of the appended claims. It is intended to cover, by suitable expression in the accompanying claims, all features of patentable novelty inherent in the invention.

What I claim is:

1. The process of accelerating the vulcanization of rubber which comprises vulcanizing rubber in the presence of a benzothiazyl sulphide accelerator and an activator for said accelerator which is a complex compound of a zinc salt with a primary amine.

2. The process of accelerating the vulcanization of rubber which comprises vulcanizing rubber in the presence of a benzothiazyl sulphide accelerator and a complex compound of zinc chloride and cyclohexylamine.

3. The process of accelerating the vulcanization of rubber which comprises vulcanizing rubber in the presence of a benzothiazyl sulphide accelerator and an activator for said accelerator which is a complex compound of zinc chloride and a saturated primary amine.

4. The process of accelerating the vulcanization of rubber which comprises vulcanizing rubber in the presence of a benzothiazyl sulphide accelerator and an activator for said accelerator which is a complex compound of a zinc salt with a saturated primary amine.

5. The vulcanizates obtained by the process of claim 1.

6. The process of accelerating the vulcanization of rubber which comprises vulcanizing rubber in the presence of an organic accelerator from the group consisting of ultra and semi-ultra accelerators and an activator for said accelerator which is a complex compound of a metal salt with an amine from the group consisting of primary amines, secondary amines of aliphatic characteristics and tertiary aliphatic amines.

7. The process of accelerating the vulcanization of rubber which comprises vulcanizing rubber in the presence of an organic accelerator from the group consisting of ultra and semi-ultra accelerators and an activator for said accelerator which is a complex compound of a zinc salt with an amine from the group consisting of primary amines, secondary amines of aliphatic characteristics and tertiary aliphatic amines.

8. The process of accelerating the vulcanization of rubber which comprises vulcanizing rubber in the presence of an organic accelerator from the group consisting of ultra and semi-ultra accelerators and an activator for said accelerator which is a complex compound of zinc chloride and cyclohexyl amine.

9. The process of accelerating the vulcanization of rubber which comprises vulcanizing rubber in the presence of a benzothiazyl sulphide accelerator and an activator for said accelerator which is a complex compound of a metal salt with an amine from the group consisting of primary amines, secondary amines of aliphatic characteristics and tertiary aliphatic amines.

10. The process of accelerating the vulcanization of rubber which comprises vulcanizing rubber in the presence of a benzothiazyl sulphide accelerator and an activator for said accelerator which is a complex compound of a zinc salt with an amine from the group consisting of primary amines, secondary amines of aliphatic characteristics and tertiary aliphatic amines.

11. The process of accelerating the vulcanization of rubber which comprises vulcanizing rubber in the presence of an organic accelerator from the group consisting of ultra and semi-ultra accelerators and an activator for said accelerator which is a complex compound of a metal salt of an inorganic acid with an amine from the group consisting of primary amines, secondary amines of aliphatic characteristics and tertiary aliphatic amines.

12. The process of accelerating the vulcanization of rubber which comprises vulcanizing the rubber in the presence of a thiazyl sulphide vulcanization accelerator and an activator for said accelerator which is a complex compound of a metal salt of a dithiocarbamic acid derived from a primary amine with an amine from the group consisting of primary amines, secondary amines of aliphatic characteristics and tertiary aliphatic amines.

13. The process of accelerating the vulcanization of rubber which comprises vulcanizing the rubber in the presence of a thiazyl sulphide vulcanization accelerator and an activator for said accelerator which is a complex compound of a metal salt of a carboxylic acid with an amine from the group consisting of primary amines, secondary amines of aliphatic characteristics and tertiary aliphatic amines.

14. The process of accelerating the vulcanization of rubber which comprises vulcanizing rubber in the presence of an organic accelerator from the group consisting of ultra and semi-ultra accelerators and an activator for said accelerator which is a complex compound of a metal salt with an amyl amine.

15. The process of accelerating the vulcanization of rubber which comprises vulcanizing rubber in the presence of an organic accelerator from the group consisting of ultra and semi-ultra accelerators and an activator for said accelerator which is a complex compound of a zinc salt and cyclohexylamine.

16. The vulcanizates obtained by the process of claim 6.

JOY G. LICHTY.